Patented Oct. 17, 1933

1,931,226

UNITED STATES PATENT OFFICE 1,931,226

ROSIN COMPOSITION

Irwin W. Humphrey, Wharton, N. J., assignor to Hercules Powder Company, Wilmington, Del., a corporation of Delaware No Drawing. Application July 17, 1928
Serial No. 293,498

8 Claims. (Cl. 87—2)

My invention relates to an improvement in rosin compositions and more particularly to rosin compositions of a character such that the normal tendency of the rosin to crystallize is retarded or prevented.

As is well known, rosin, both gum rosin and wood rosin, has a tendency to crystallize and will generally crystallize in time, as when the rosin is stored, or when it is compounded with other materials, as for example, in core oils, varnishes, printing ink, etc. The presence of crystals in rosin is an objection to its use, since the crystallized rosin has a higher melting point than has uncrystallized rosin and may enter into reaction with other materials more slowly than will uncrystallized rosin. Further, the tendency of rosin to crystallize will cause it to crystallize out of rosin compositions, such as core oils, wherein the rosin is present in solution in linseed and petroleum oils.

Now in accordance with my invention, I have discovered that if there be added to ordinary gum or wood rosin a rosin-distillation residue, obtained by the distillation of either wood or gum rosin, the tendency of the rosin to crystallize will be greatly retarded.

In preparing the rosin distillation residue for addition to rosin, either gum or wood rosin may be used and the rosin may be given, if desired, a preliminary treatment by refining, heating or by blowing with air. The rosin, whether or not given a preliminary treatment, is subjected to distillation, preferably under reduced pressure. If the distillation residue is added to ordinary rosin, or to a rosin composition as a core oil, the crystallization of either will be retarded.

In producing the rosin distillation residue from wood or gum rosin, the rosin may be distilled at a bath temperature within about the range 250° C.–300° C., under a pressure within about the range 5–50 millimeters of mercury, a residue amounting to from about 5–20 per cent. of the original rosin being obtained. The residue will have a higher melting point and a lower acid number than that of the original rosin; thus the acid number may vary from about 30 to 130, but generally falls between about 50 to 100, as compared with an acid number of 150 to 170 for the original rosin, and the melting point will be between about 90° C. and 140° C., drop method, as compared with 75° C. to 85° C. for the original rosin.

As illustrative, for example, wood rosin may be distilled at a temperature of 260° C.–290° C., under about 10 mm. pressure, to obtain a residue amounting to about 15% of the original rosin, or gum rosin, for example, Gum F rosin, may be distilled at the same temperature under about 10 mm. pressure and a residue amounting to about 12% of the original rosin obtained.

The rosin distillation residue obtained as above is added to, for example, either wood or gum rosin or to a rosin composition, as a core oil, varnish, printing ink, etc. As illustrative, to a core oil, including 30 parts wood rosin, 30 parts kerosene oil and 30 parts linseed oil, about ten parts of the above described wood rosin distillation residue is added, or to a core oil including 30 parts each kerosene oil and linseed oil and 32 parts of wood rosin, eight parts of the above described gum rosin distillation residue may be added. As has been indicated, the rosin distillation residue may be added to wood or gum rosin in order to retard its crystallization, the rosin and the rosin distillation residue being melted together, and, for example, 100 parts of wood rosin may be fused with from two to ten parts of rosin distillation residue.

Core oils having gum or wood rosin distillation residue added as indicated above, will resist crystallization for a period of more than four months as compared to about a week for a similar core oil containing 40 parts of rosin, but without the addition of the rosin distillation residue.

It will be understood that the rosin distillation residue may be produced from either wood or gum rosin and that its addition to either wood or gum rosin or to rosin compositions will be effective in retarding crystallization of the rosin.

Having now fully described my invention, what I claim and desire to protect by Letters Patent is:

1. A rosin composition resistant to crystallization which includes rosin to which has been added a rosin-distillation residue.

2. A rosin composition resistant to crystallization which includes rosin in solution to which has been added a rosin-distillation residue.

3. A rosin composition resistant to crystallization which includes rosin, a petroleum distillate, linseed oil and a rosin-distillation residue.

4. A rosin composition resistant to crystallization which includes rosin, a petroleum distillate, linseed oil and a rosin-distillation residue in amount up to about 15%.

5. A rosin composition resistant to crystallization which includes rosin to which has been added a rosin-distillation residue in amount up to about 15%.

6. A rosin composition resistant to crystallization which includes rosin and a petroleum distillate to which has been added a rosin-distillation residue.

7. A rosin composition resistant to crystallization which includes rosin and a rosin distillation residue of higher melting point and lower acid number than the rosin included.

8. A rosin composition resistant to crystallization which includes rosin to which has been added a rosin distillation residue of the distillation of rosin under reduced pressure at a temperature within about the range 250° C.–300° C.

IRVIN W. HUMPHREY.

CERTIFICATE OF CORRECTION.

Patent No. 1,931,226.   October 17, 1933.

IRVIN W. HUMPHREY.

It is hereby certified that error appears in the printed specification of the above numbered patent requiring correction as follows: In the heading to the printed specification, line 3, name of inventor, for "Irwin W. Humphrey" read Irvin W. Humphrey; and that the said Letters Patent should be read with this correction therein that the same may conform to the record of the case in the Patent Office.

Signed and sealed this 28th day of November, A. D. 1933.

(Seal)   F. M. Hopkins,
Acting Commissioner of Patents.